Aug. 15, 1933.  M. C. TERRY  1,922,508

REFRIGERATING APPARATUS

Filed March 17, 1930

INVENTOR
Matson C. Terry

BY
ATTORNEY

Patented Aug. 15, 1933

1,922,508

UNITED STATES PATENT OFFICE 1,922,508

REFRIGERATING APPARATUS

Matson C. Terry, Mansfield, Ohio, assignor to Westinghouse Electric & Manufacturing Company, a Corporation of Pennsylvania Application March 17, 1930. Serial No. 436,342

3 Claims. (Cl. 62—4)

This invention relates to refrigerating apparatus and particularly to apparatus of the type in which the motor and the compressor are enclosed within a hermetically sealed casing.

It is an object of the invention to provide a hermetically sealed motor-compressor unit in which the motor is of the type which operates without any moving contacts or brushes.

More specifically, an object of the invention is to provide a sealed motor-and-compressor unit in which a single-phase motor provided with starting and running windings is utilized and in which the control for the starting winding is located outside the casing.

Figure 1:
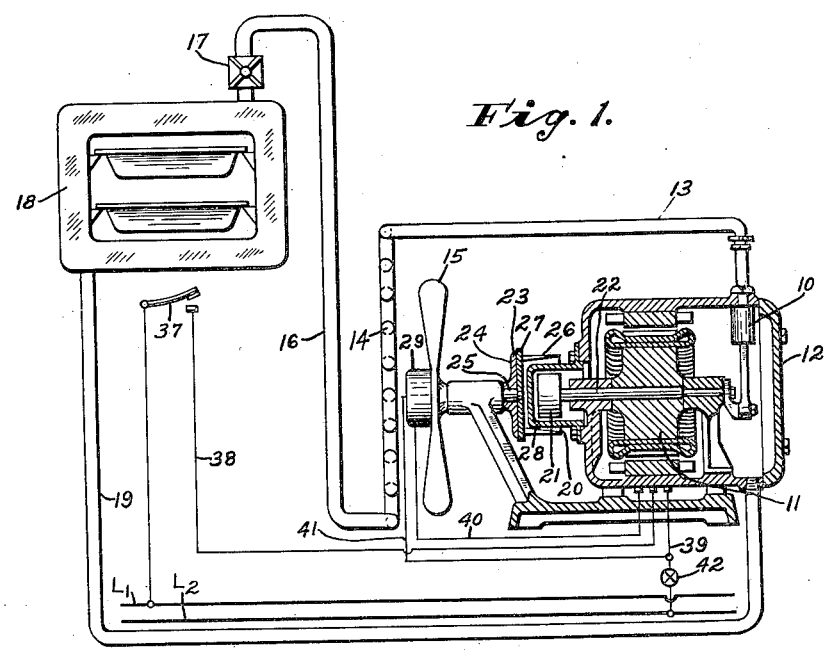
Figure 2:
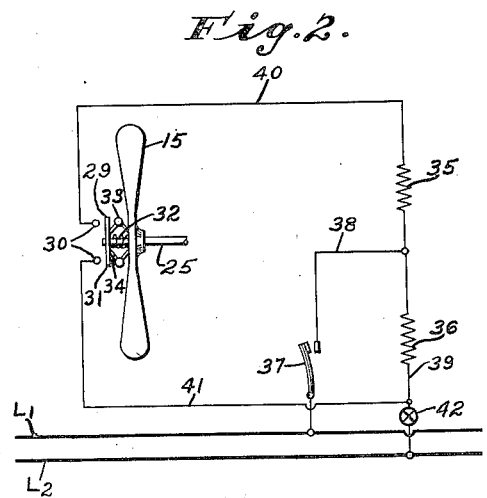

Other objects and advantages of the invention will be readily apparent from the following description and the accompanying drawing wherein:

Figure 1 is a diagrammatic representation, partly in section, of a refrigerating apparatus embodying the invention; and Fig. 2 is a wiring diagram of the motor circuit.

It is well known that, in refrigerating machines in which the motor and the compressor are hermetically sealed, it is desirable that the motor should have no moving contacts, such as commutator members. If such motors are used, there is danger of accidents because of the sparks generated when the cooperating contacts move into and out of engagement with each other, particularly when the refrigerant which envelopes the motor is of an inflammable nature. Moreover, the contact members may corrode and are not readily accessible for repairs or replacement.

It has, therefore, been the practice to use, in a sealed unit, a single-phase induction motor provided with starting and running windings. It is necessary, in a motor of this type, to provide some means for cutting out the starting winding when the motor has reached its approximate normal operating speed. A centrifugal switch mounted on the motor shaft has been found satisfactory for this purpose when the motor is not enclosed in a sealed casing containing a refrigerant. However, if the motor is enclosed in a casing containing a refrigerant, a centrifugal switch is not desirable because of the sparks generated, as in the case of the use of a commutator motor.

The present invention utilizes a refrigerating apparatus provided with a fan for cooling a condenser, such fan being necessarily located outside the sealed casing containing the motor and compressor. The apparatus may have also a centrifugal switch for controlling the starting winding of the enclosed motor mounted on the fan shaft.

The combination which I employ has many important advantages. All danger of sparking within the casing is eliminated, the centrifugal switch is readily accessible for repairs, the switch can be adjusted easily to operate under the most satisfactory conditions, according to the particular machine to which it is applied, and if, for some reason, the fan should fail to operate, and thereby prevent condensation of the compressed refrigerant, the starting winding would stay in the circuit, and the resultant high-current flow through the motor could be utilized to operate a thermal fuse or overload circuit breaker and thus prevent the machine from operating until the difficulty could be remedied.

In the specific embodiment of my invention shown in the accompanying drawing, the compressor 10 is driven by an induction motor 11. The motor and the compressor are completely enclosed within a hermetically sealed casing 12. The compressed refrigerant passes through a conduit 13 to the condenser 14, where it is liquefied. A blast of air generated by a fan 15 serves to remove the heat from the condenser. The condenser refrigerant passes through a conduit 16 to the expansion valve 17. In passing through the valve 17 to the evaporator 18, the pressure on the refrigerant is materially reduced. In the evaporator, the refrigerant expands, because of the heat absorbed from the substances to be cooled, and is returned, in a gaseous state, to the compressor through a conduit 19.

In the specific embodiment of the invention illustrated, the fan 15 is driven by the encased motor 11, through a magnetic coupling 20. The coupling comprises, in general, a magnetized rotor 21 located within the sealed casing and mounted on one end of the motor shaft 22. The rotor constitutes the driving member of the magnetic coupling. The driven member 23, which is located outside the casing comprises a disc 24 of steel or other magnetic material mounted on one end of the fan shaft 25 and provided, near its circumference, with a plurality of teeth 26 which extend parallel to the axis of the disc 25 and surround the rotor 21. A disc 27 of good conducting material, for example, aluminum, fits snugly over the teeth 26. The sealed casing 12 is provided with a non-magnetic wall 28 of cup shape interposed between the driving and the driven parts of the magnetic coupling. The details of the magnetic driving means for the fan are completely described and claimed in the co-pending application of Milton C. Kalischer, Serial No. 338,013, filed February 6, 1929 for Driving Mechanism, and assigned to the Westinghouse Electric & Manufacturing Company.

A centrifugal switch 29 is mounted on the fan shaft 25. The switch is shown conventionally as comprising a pair of fixed contact members 30 and a movable bridging contact member 31. When the fan is at rest, and until it has reached a predetermined speed, the contact member 31 is held against the contact members 30 by a spring 32. When the fan has reached a predetermined speed, the weights 33, acting through toggles 34, overcome the force of the spring and move the contact member 31 axially away from the contact members 30. The centrifugal switch controls the flow of current through the starting winding 35 of motor 11. The motor is also provided with a running winding 36.

Both windings of the motor are initially energized by current passing from line conductor $L_1$ through a thermostat 37. The thermostat is placed adjacent to the evaporator 18 and is responsive to the temperature of the evaporator, or the chamber to be cooled, or both. Current passes from the thermostat through conductor 38 to the starting and running windings 35 and 36, respectively, which are connected in parallel. The main or running winding 36 is connected to line conductor $L_2$ by a conductor 39. The starting winding 35 is connected to one of the fixed contacts 30 of the centrifugal switch 29, by a conductor 40, while a conductor 41 connects the other fixed contact 30 to the conductor 39 which is, in turn, connected to the line conductor $L_2$. A thermal fuse or overload circuit breaker 42 is interposed in the conductor 39 between the line conductor $L_2$ and the point of contact of conductor 41.

In the operation of the invention, when the evaporator 18 has reached a predetermined high temperature, the thermostat 37 closes. Current then passes from line conductor $L_1$ through the thermostat conductor 38, running winding 36 and conductor 39 to line conductor $L_2$. Current also passes through the starting winding 35, conductor 40, contact members 30, 31 and conductors 41 and 39 to the line conductor $L_2$. The motor starts with both windings energized. The compressor 10 is thereby driven, and, likewise, the fan 15 is actuated through the magnetic coupling 20. When the motor 11, and, consequently, the fan 15, has reached a predetermined speed, the centrifugal switch 29 is opened, and the starting winding is deenergized to remain so as long as the fan operates satisfactorily.

If the fan fails to start, or stops for any reason while the motor is running, current will flow through both windings and eventually operate the overload device 42 to break the circuit through the motor. When the machine is at rest, the centrifugal switch is automatically closed, and the machine is in condition for immediate starting.

It will be apparent from the foregoing description that this invention provides a practical and desirable means for controlling the starting winding of a hermetically sealed induction motor. The control is accessible from outside the sealed casing, is readily adjustable and eliminates the danger of sparking within the casing in contact with the refrigerant gases.

While I have shown and described a single embodiment of my invention, it will be apparent that other forms could be utilized, all coming within the scope of the appended claims.

I claim as my invention:

1. In a refrigerating apparatus, a motor, starting and running windings for said motor, a compressor, a fluid-tight casing enclosing said motor and compressor, a condenser, an evaporator, a fan for forcing air over the condenser, said fan being driven by said motor, and means responsive to the speed of the fan for controlling the starting winding of said motor.

2. In a refrigerating apparatus, a motor, starting and running windings for said motor, a compressor driven by the motor, a fluid-tight casing enclosing the motor and compressor, a condenser, an evaporator, a fan for forcing air over the condenser, inductive driving means between the motor and the fan, and means responsive to the speed of the fan for controlling the starting winding of said motor.

3. A refrigerating apparatus in which a refrigerant is successively compressed, condensed and evaporated, a motor, starting and running windings for said motor, a compressor, a fluid-tight casing enclosing the motor and compressor and means located outside the casing and driven inductively by the motor for controlling its starting winding.

MATSON C. TERRY.